United States Patent
Lalonde et al.

(10) Patent No.: US 12,358,752 B2
(45) Date of Patent: Jul. 15, 2025

(54) METHOD AND SYSTEM FOR A ROBOTIC TAPE APPLICATOR

(71) Applicant: INNOVATIVE AUTOMATION INC., Barrie (CA)

(72) Inventors: Michael Lalonde, Barrie (CA); Zac Cutt, Barrie (CA); Michael Sutton, Barrie (CA); Robert Dorion, Barrie (CA)

(73) Assignee: INNOVATIVE AUTOMATION INC., Barrie (CA)

( * ) Notice: Subject to any disclaimer, the term of this patent is extended or adjusted under 35 U.S.C. 154(b) by 409 days.

(21) Appl. No.: 17/755,795

(22) PCT Filed: Nov. 9, 2020

(86) PCT No.: PCT/CA2020/051516
§ 371 (c)(1),
(2) Date: May 9, 2022

(87) PCT Pub. No.: WO2021/087622
PCT Pub. Date: May 14, 2021

(65) Prior Publication Data
US 2022/0396450 A1    Dec. 15, 2022

Related U.S. Application Data

(60) Provisional application No. 62/932,699, filed on Nov. 8, 2019.

(51) Int. Cl.
*B65H 51/22* (2006.01)
*B25J 9/16* (2006.01)
(Continued)

(52) U.S. Cl.
CPC ............ *B65H 51/22* (2013.01); *B25J 9/1684* (2013.01); *B25J 13/08* (2013.01); *B25J 15/0019* (2013.01);
(Continued)

(58) Field of Classification Search
CPC ...... B65H 51/22; B65H 16/103; B65H 20/34; B65H 23/044; B65H 35/0033;
(Continued)

(56) References Cited

U.S. PATENT DOCUMENTS 1,005,134 A * 10/1911 Balliett ................. F16L 11/112
138/132
3,992,244 A    11/1976 Craig et al.
(Continued)

FOREIGN PATENT DOCUMENTS

CN    1187169    7/1998
CN    1533348    9/2004
(Continued)

OTHER PUBLICATIONS

Extend European Search Report from related EP Appln. No. 20885651.8, dated Apr. 30, 2024.
(Continued)

*Primary Examiner* — Cynthia L Schaller
(74) *Attorney, Agent, or Firm* — Grossman, Tucker, Perreault & Pfleger, PLLC

(57) ABSTRACT

A system comprising: a source of a tape comprising a material associated with an adhesive and at least one removable liner; an applicator head; a cutting mechanism; at least one drive feeding mechanism configured to index the tape from the source to the applicator head at a controlled rate; wherein the applicator head is controllable to apply the material on a surface or a substrate; and wherein the applicator head comprises a cutting mechanism configured to (Continued)

sever the material while leaving the at least one removable liner intact.

37 Claims, 9 Drawing Sheets

(51) Int. Cl.
| | |
|---|---|
| *B25J 13/08* | (2006.01) |
| *B25J 15/00* | (2006.01) |
| *B25J 19/06* | (2006.01) |
| *B29C 70/38* | (2006.01) |
| *B65H 16/10* | (2006.01) |
| *B65H 19/18* | (2006.01) |
| *B65H 20/00* | (2006.01) |
| *B65H 20/34* | (2006.01) |
| *B65H 23/04* | (2006.01) |
| *B65H 35/00* | (2006.01) |
| *B65H 51/20* | (2006.01) |
| *B65H 51/30* | (2006.01) |
| *B65H 59/04* | (2006.01) |
| *B65H 59/38* | (2006.01) |
| *B65H 67/02* | (2006.01) |
| *B65H 69/06* | (2006.01) |

(52) U.S. Cl.
CPC ......... *B29C 70/386* (2013.01); *B65H 16/103* (2013.01); *B65H 19/1852* (2013.01); *B65H 20/005* (2013.01); *B65H 20/34* (2013.01); *B65H 23/044* (2013.01); *B65H 35/0033* (2013.01); *B65H 35/008* (2013.01); *B65H 51/20* (2013.01); *B65H 51/30* (2013.01); *B65H 59/04* (2013.01); *B65H 59/387* (2013.01); *B65H 67/02* (2013.01); *B65H 69/06* (2013.01); *B25J 19/06* (2013.01); *B65H 2301/511* (2013.01); *B65H 2301/51122* (2013.01); *B65H 2404/5311* (2013.01); *B65H 2404/5391* (2013.01); *B65H 2406/312* (2013.01); *B65H 2553/80* (2013.01); *B65H 2701/11332* (2013.01); *B65H 2701/377* (2013.01); *B65H 2701/3772* (2013.01)

(58) Field of Classification Search
CPC ...... B65H 35/008; B65H 51/30; B65H 59/04; B65H 59/387; B65H 2301/51122; B65H 2404/5391; B65H 2406/312; B65H 2553/80; B65H 2701/11332; B65H 2701/377; B65H 2701/3772; B25J 9/1684; B25J 13/08; B25J 15/0019; B25J 11/00
See application file for complete search history.

(56) References Cited

U.S. PATENT DOCUMENTS

| | | | |
|---|---|---|---|
| 4,214,933 A | 7/1980 | Off et al. | |
| 4,329,840 A | 5/1982 | Gasser et al. | |
| 4,486,261 A | 12/1984 | Koller et al. | |
| 4,530,471 A | 7/1985 | Inoue | |
| 4,655,873 A | 4/1987 | Oly | |
| 4,690,349 A | 9/1987 | Yamaguchi et al. | |
| 4,696,707 A | 9/1987 | Lewis et al. | |
| 4,915,282 A * | 4/1990 | Martin | B65H 20/34 226/118.3 |
| 4,980,011 A | 12/1990 | Gruber et al. | |
| 5,139,206 A | 8/1992 | Butler | |
| 5,366,131 A | 11/1994 | Hoffa et al. | |
| 5,411,223 A | 5/1995 | Gatteschi | |
| 5,482,593 A | 1/1996 | Kuhn et al. | |
| 5,611,550 A | 3/1997 | Belser | |
| 5,885,391 A | 3/1999 | Cram et al. | |
| 5,937,725 A | 8/1999 | Kamijo et al. | |
| 5,964,392 A | 10/1999 | Long, Jr. | |
| 6,024,148 A | 2/2000 | Saitoh et al. | |
| 6,047,873 A * | 4/2000 | Carlberg | B65H 23/02 242/615.3 |
| 8,475,611 B2 | 7/2013 | Malecki et al. | |
| 9,175,190 B2 | 11/2015 | Paschmann et al. | |
| 10,000,357 B2 | 6/2018 | Brockman et al. | |
| 2005/0161161 A1* | 7/2005 | Sharp | B65H 35/0013 156/353 |
| 2005/0193544 A1 | 9/2005 | Supina et al. | |
| 2007/0142952 A1 | 6/2007 | Yamamoto et al. | |
| 2007/0228016 A1 | 10/2007 | Kita et al. | |
| 2011/0048609 A1* | 3/2011 | Miyamoto | B65H 37/002 156/64 |
| 2017/0341314 A1* | 11/2017 | Baker | G05B 19/401 |

FOREIGN PATENT DOCUMENTS

| | | |
|---|---|---|
| CN | 101168418 | 4/2008 |
| CN | 105473477 | 4/2016 |
| CN | 107073508 | 8/2017 |
| DE | 69616892 | 5/2002 |
| EP | 0196118 | 10/1986 |
| EP | 0287802 | 10/1988 |
| EP | 0857599 | 10/2001 |
| FI | 951450 | 10/1995 |
| JP | 6-144665 | 5/1994 |
| JP | 6-210744 | 8/1994 |
| JP | 9-202515 | 8/1997 |
| JP | 11-268863 | 10/1999 |
| JP | 2001-019919 | 1/2001 |
| JP | 2007-173305 | 7/2007 |
| JP | 2018-188290 | 11/2018 |
| WO | 2014/097675 | 6/2014 |

OTHER PUBLICATIONS

Extend European Search Report from related EP Appln. No. 208855816.7, dated Apr. 4, 2024.
Extend European Search Report from related EP Appln. No. 20884719.4. dated Mar. 15, 2024.
Extend European Search Report from related EP Appln. No. 20884628.7, dated Apr. 3, 2024.
Office Action from related Canadian Appln. No. 3,160,717, dated Apr. 2, 2024.
Office Action from related Canadian Appln. No. 3,160,718, dated Apr. 2, 2024.
Office Action from related Brazilian Appln. No. BR112022008917-1, dated Nov. 14, 2023. English translation attached.
International Search Report and Written Opinion from related PCT Appln. No. PCT/CA2020/051517, dated Jan. 5, 2021.
International Search Report and Written Opinion from related PCT Appln. No. PCT/CA2020/051518, dated Feb. 4, 2021.
International Search Report and Written Opinion from related PCT Appln. No. PCT/CA2020/051519, dated Jan. 25, 2021.
International Search Report and Written Opinion from corresponding PCT Appln. No. PCT/CA2020/051516, dated Feb. 4, 2021. 9 pages.
Office Action from related Chinese Appln. No. 2020800848669, dated Oct. 30, 2024. English translation attached.
Office Action from related Japanese Appln. No. 2022-552990, dated Nov. 26, 2024. English translation attached.
Office Action from related Japanese Appln. No. 2022-552992, dated Nov. 5, 2024. English translation attached.
Office Action from related Chinese Appln. No. 2020800848599, dated Jun. 25, 2024. English translation attached.
Office Action from related Japanese Appln. No. 2022-552991, dated Sep. 17, 2024. English translation attached.
English translation of Office Action from related Chinese Appln. No. 2020800848993, dated Mar. 5, 2025.

(56) References Cited

OTHER PUBLICATIONS

English translation of Office Action from related Japanese Appln. No. 2022-552992, dated Mar. 11, 2025.

\* cited by examiner

METHOD AND SYSTEM FOR A ROBOTIC TAPE APPLICATOR

FIELD

The present disclosure relates to an automated apparatus for application of adhesive tape on a substrate.

BACKGROUND

Adhesive-backed tape is commonly applied to body surfaces, interior and exterior claddings and panels (e.g. trim, moldings, covers, trays, panels, doors and hatches) of a vehicle (e.g., an automobile, aircraft, or watercraft), or structures (e.g. buildings, HVAC units). For example, an adhesive-backed tape mounted around the periphery of a cladding on a vehicle component provides a seal which helps to control water intrusion, and reduce cabin noise due to wind when the vehicle is in motion, as well as control dust intrusion into the cabin and engine parts. Such tapes may be manually installed, however such a process is not only slow, but labour intensive, and prone to human error. In addition, the application process may not be uniform, predictable or reproducible.

Several methods have been proposed to apply adhesive-backed tape on substrates, such as those employing robotic end effectors or fixed applicators. However, these methods suffer from several challenges, such as, inaccurate placement of the adhesive tape, constant cycle interruptions due to jams within the equipment, tape breakages due to lack of adequate tension control, and the inevitable downtime due to spool changes during a production cycle. Furthermore, industry adoption of automated applicator equipment has been slow for numerous reasons such as: application geometry constraints (i.e. having a large roll mounted on the applicator head), speed and volume of application, as the roll size is limited, cell design constraints. In addition, existing equipment is typically only capable of holding/dispensing rolls of tape that are less than 40 meters in length, and therefore this equipment is incapable of keeping up with the production demands

SUMMARY OF THE INVENTION

In one of its aspects, there is provided a system comprising:
  a source of a tape, the tape comprising a material associated with an adhesive and at least one removable liner;
  an applicator head;
  a cutting mechanism;
  at least one drive feeding mechanism configured to index the tape from the source to the applicator head at a controlled rate;
  wherein the applicator head is controllable to apply the material on a surface or a substrate; and
  wherein the applicator head comprises a cutting mechanism configured to sever the material while leaving the at least one removable liner intact.

In another of its aspects, there is provided a system for applying a tape to a surface or a substrate, the tape comprising a material associated with an adhesive and at least one removable liner, the system comprising:
  a source of the tape;
  a robotic applicator head comprising an application tip;
  a flexible tape conduit coupled between the source and the robotic applicator head;
  at least one drive feeding mechanism;
  a cutting mechanism;
  a controller comprising program instructions executable by a processor to at least cause:
  the at least one drive feeding mechanism to index the tape from the source to the application tip;
  the application tip to apply the material to the surface or the substrate in accordance to a predefined path; and
  the cutting mechanism to sever the material while leaving at least one removable liner intact.

In another aspect, there is provided a method of applying a tape to a surface or a substrate, the tape comprising a material and at least one removable liner, the method comprising the steps of:
  (a) at a first tape station, receiving the tape from a primary tape supply source;
  (b) feeding the tape into a flexible infeed conduit coupled between the first tape station and a robotic end-effector having a tape applicator, the flexible conduit being dimensioned to permit transport of the tape to the remote robotic end-effector;
  (c) at a second tape station associated with the tape applicator, receiving the tape from the primary tape supply source to form a secondary source of tape;
  (d) at the tape applicator, applying the material on the surface or the substrate along a predefined path and removing the at least one removable liner from the primary tape and; and
  (e) at the end of the predefined path, severing the material while leaving the at least one removable liner intact.

Advantageously, the robotized tape application system allows for faster application rates, and increased efficiency; accurate and consistent application of the tape; reduced labor costs and increased flexibility by allowing for longer application times, and application of tape in more complex paths on the substrate. In addition, the robotized tape application minimizes human intervention and human error during runtime.

DETAILED DESCRIPTION

Figure 1A:
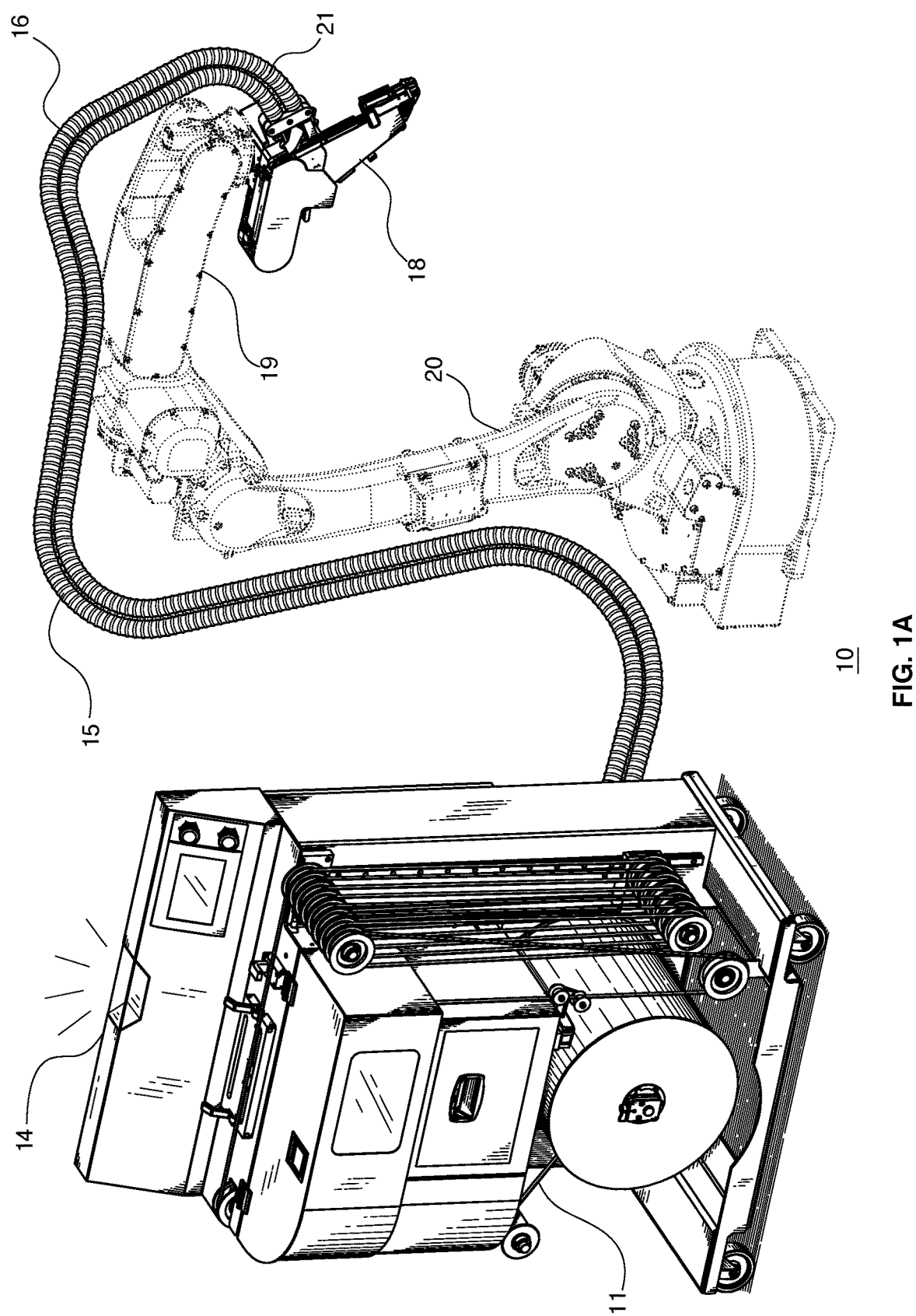
FIG. 1a shows a perspective view of an exemplary robotic adhesive tape application system.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Like reference numerals are used to designate like parts in the accompanying drawings.

The detailed description provided below in connection with the appended drawings is intended as a description of the present examples and is not intended to represent the only forms in which the present example may be constructed or used. However, the same or equivalent functions and sequences may be accomplished by different examples.

Figure 1B:
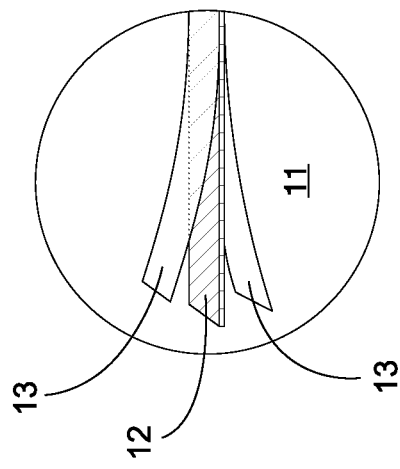
FIG. 1b shows an exemplary tape.
Figure 1C:
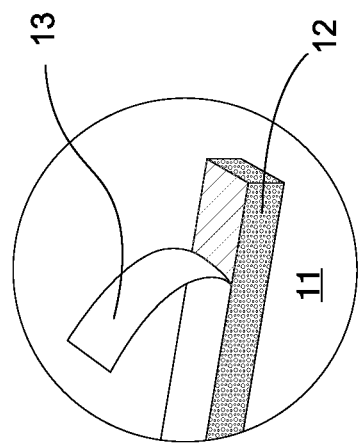
FIG. 1c shows another exemplary tape.
Figure 1D:
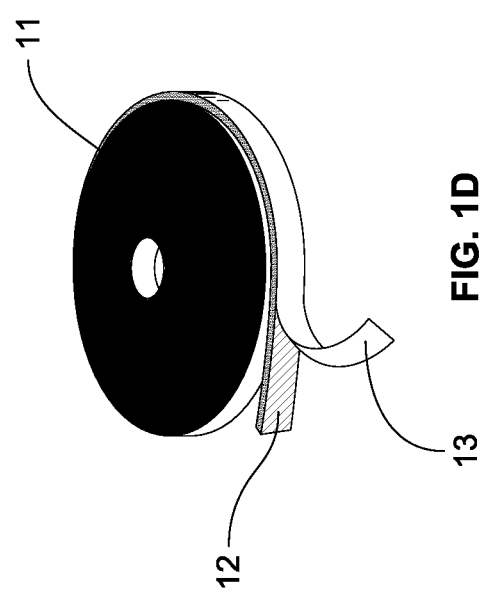
FIG. 1d shows a roll of the exemplary tape.
Figure 1E:
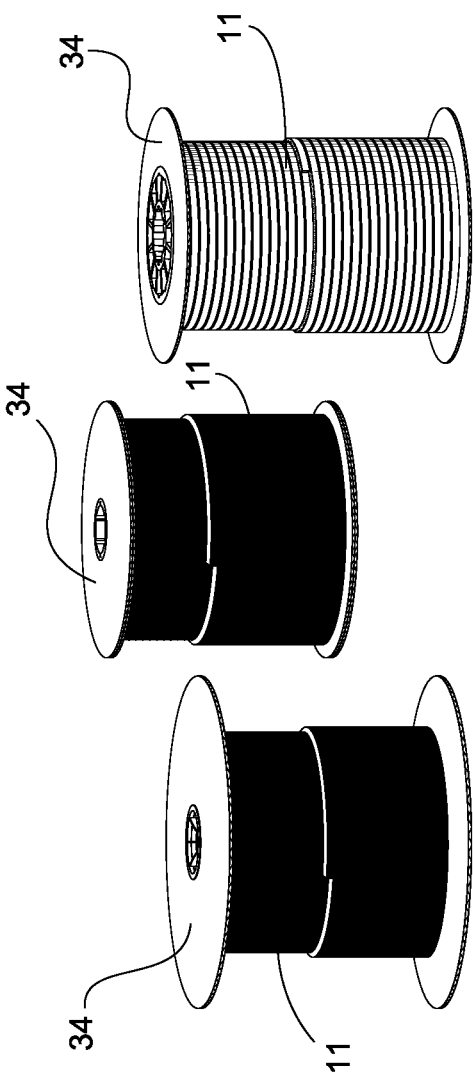
FIG. 1e shows spools of the exemplary tape.

Referring to FIGS. 1a-e, there is shown a robotic tape applicator system for attaching a tape to a receiving surface or a substrate, generally identified by numeral 10, in an exemplary embodiment. FIGS. 1b and 1c show tape 11, such as adhesive tape, or double-sided tape, comprising material 12 and tape liner 13, while FIGS. 1d and 1e show a roll and spool of adhesive lined tape 11, respectively. System 10 comprises payout device 14 which feeds adhesive tape 11 into flexible conduit 15 terminating at adhesive tape applicator head 18 mounted on robotic arm 19 of an industrial robot 20 with various axis configurations. For example, the industrial robot may include six axes, or six degrees of freedom, which allow for greater flexibility. Accordingly, flexible conduit 15 bends as needed based on the movements of robotic arm 19. Flexible conduit 15 comprises infeed conduit 16 through which adhesive tape 11 is conveyed from payout device 14 to applicator head 18, and alongside flexible infeed conduit 16 is flexible outfeed conduit 21 which transports liner 13 which is removed from material 12 and dispensed during the application process.

Figure 2B:
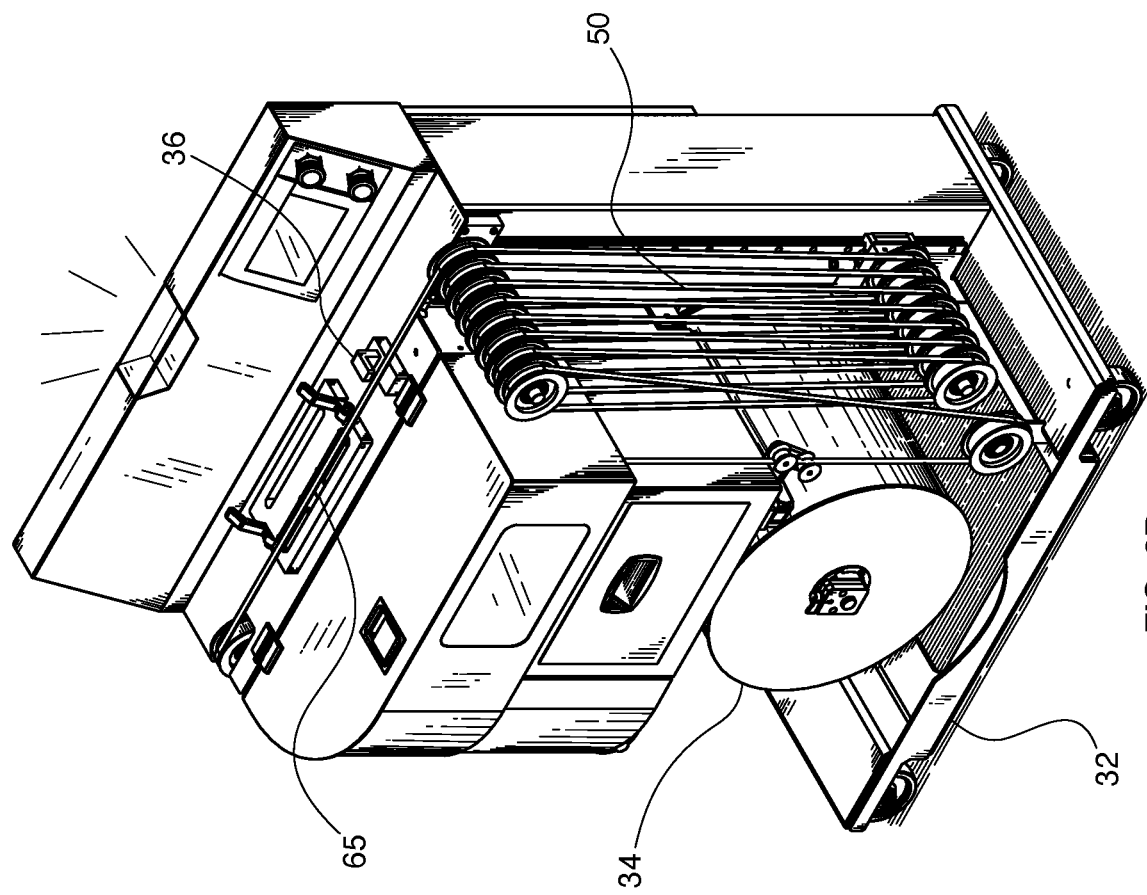
FIGS. 2a to 2c show perspective views of an exemplary spool payout device.
Figure 2A:
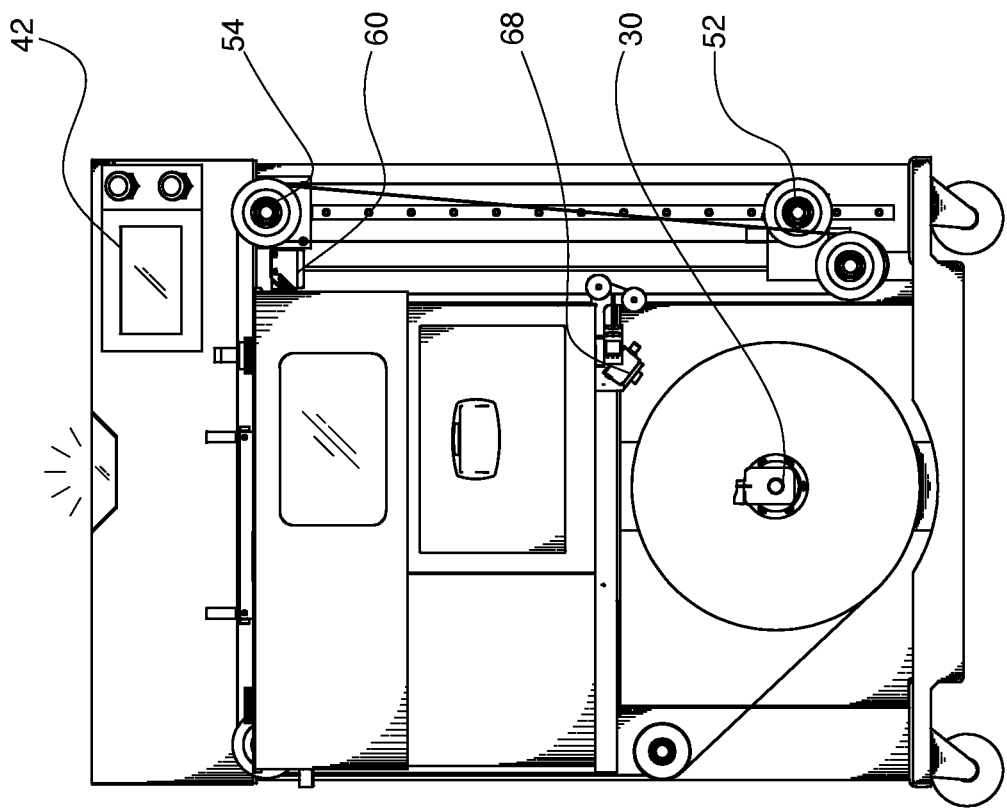
Figure 2C:
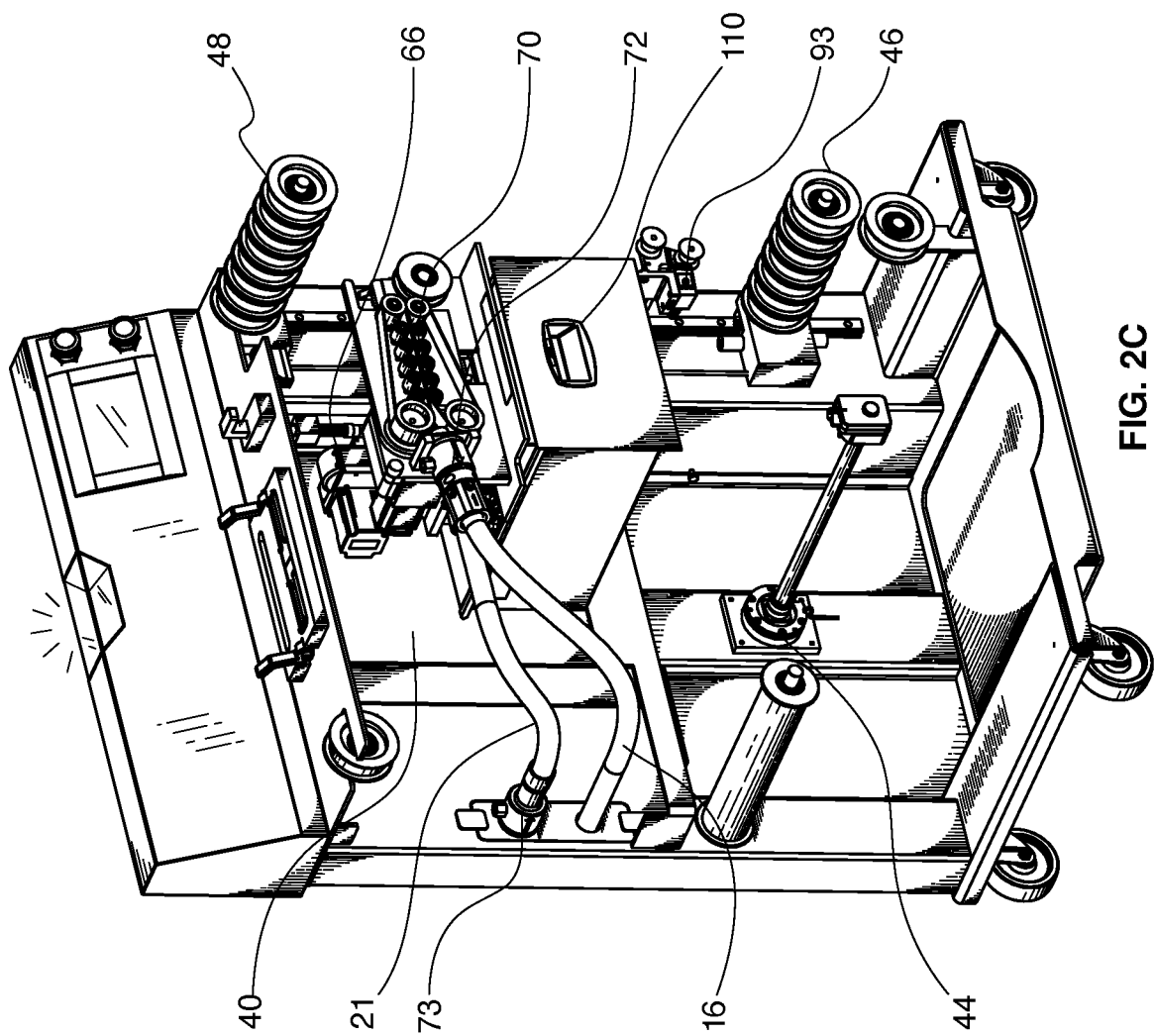

Now referring to FIGS. 2a-c, payout device 14 comprises payout spool shaft 30 rotatably attached to the mounting frame 32, and payout spool shaft or spindle 30 receives payout spool 34 of adhesive tape 11. Examples of elastomeric adhesive lined tape 11, include, but are not limited to, crushed ethylene propylene diene monomers (EPDM); neoprene closed cell; expanded polyvinyl chloride (PVC); polyethylene; acrylic foam tapes (e.g. very high bond (VHB) tape); weld-thru tapes, sealer tapes, electrical circuit tapes, heat activated tapes. Material 11 may include a range of widths, thickness and length depending on the application. In one example, material 11 comprises a width ranging from 1.5 mm to 25 mm or material thickness ranges from 0.05 mm to 20 mm. In other implementations, adhesive tape 11 can be fed from any type of tape dispensing means or tape supply means, such as a conveying platform. Payout device 14 also comprises system controller 40 which exchanges signals with associated components, such as, sensors, motors, actuators, and communicates with robotic arm 19, and applicator head 18 and other components, to provide tape 11 on demand as called for by applicator head 18 in a relatively fast, accurate and consistent manner. Human machine interface 42 is communicatively coupled to system controller 40 for inputting program instructions and configure system 10 settings, and outputting alerts, warnings, notifications and displaying system 10 settings. System controller 40 comprises board logic or programmable circuitry or a processor.

In more detail, payout spool 34 of tape 11 is unwound by toggling spool brake 44 on and off, and tape 11 is fed through a series of lower pulleys 46 and upper pulleys 48 of tape material accumulator 50. Alternatively, a spool motor is controllable to initiate and stop rotation of payout spool shaft 30 or regulate the rotational speed of payout spool shaft 30. Pulleys 46, 48 accumulate tape 11 for on the fly spool changes, and account for any feeding variances, as will be explained later. Lower pulleys 46 are mounted on lower pulley arm 52, and upper pulleys are mounted on upper pulley arm 54. Lower pulley arm 52 slides vertically, such that the position of lower pulley arm 52 determines the length of tape 11 stored in accumulator 50. As tape 11 is dispensed, lower pulley arm 52 rises, and the amount of stored tape 11 decreases. As an example, in the upper most position of lower pulley arm 52 there may be 2 meters of tape 11 in accumulator 50, while in the lower most position of lower pulley arm 52 there could be as much as 20 meters of tape 11 depending on the number of pulleys 46, 48 and windings of tape 11.

Accumulator position sensor 60 is mounted on frame 32 of accumulator 50 to detect the position of movable lower pulley arm 52, and spool level sensor 68 detects amount of tape 11 on payout spool 34. Accumulator position sensor 60 comprises a plurality of set points e.g. lower limit and upper limit. For example, when lower pulley arm 52 passes the upper limit set point spool brake 44 is released to allow new tape 11 to feed into accumulator 50, as lower pulley arm 52 falls under the force of gravity, spool 34 unwinds and accumulator 50 fills with tape 11. When lower pulley arm 52 passes the lower limit set point brake 44 is re-applied to stop spool 34 unwinding. Next, tape 11 exits accumulator 50 into payout drive mechanism 70, which indexes tape 11 out towards robotic arm 19 via flexible infeed conduit 16 at a controlled, metered rate as it is called for by applicator head 18. Drive mechanism 70 may include servo motors or stepper motors, pulleys, to control the advancement of tape 11 to applicator head 18. When spool level sensor 68 indicates spool 34 is empty, or close to being completely depleted, payout device 14 switches into a spool change mode, as will be described later. Alternatively, accumulator 50 is associated with at least one accumulator position sensor 60 which determines a numerical position of tape 11 in accumulator 50, ranging from a predefined low threshold to a predefined high threshold. When tape 11 in accumulator 50 reaches the low threshold payout spool 34 of tape 11 is unwound by toggling spool brake 44 off or actuating spool motor to rotate payout spool shaft 30, and feed tape 11 through a series of lower pulleys 46 and upper pulleys 48 of tape material accumulator 50. In another implementation, accumulator position sensor 60 comprises a plurality of sensors located at different positions associated with the lower limit and the higher limit.

Payout drive mechanism 70 comprises fluid amplifier 72 which creates a vacuum effect inside therein to effectively reduce frictional forces between tape 11 and the interior wall of flexible conduit 16 as tape 11 is fed along flexible conduit 16 towards applicator head 18. The vacuum is activated only when payout drive mechanism 70 is feeding new tape 11.

Figure 4:
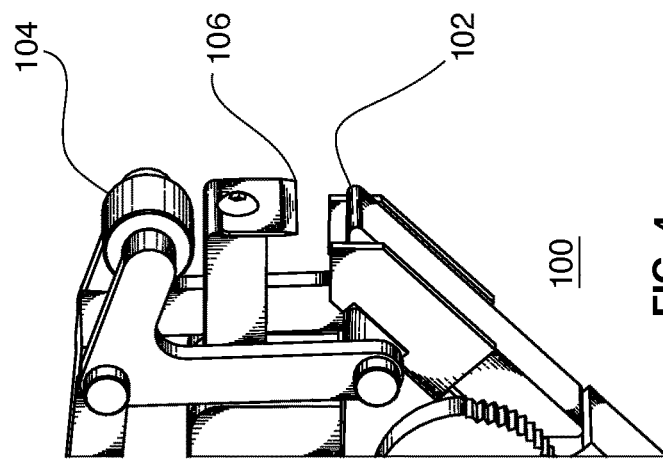
FIG. 4 shows a view of an exemplary application tip.
Figure 3:
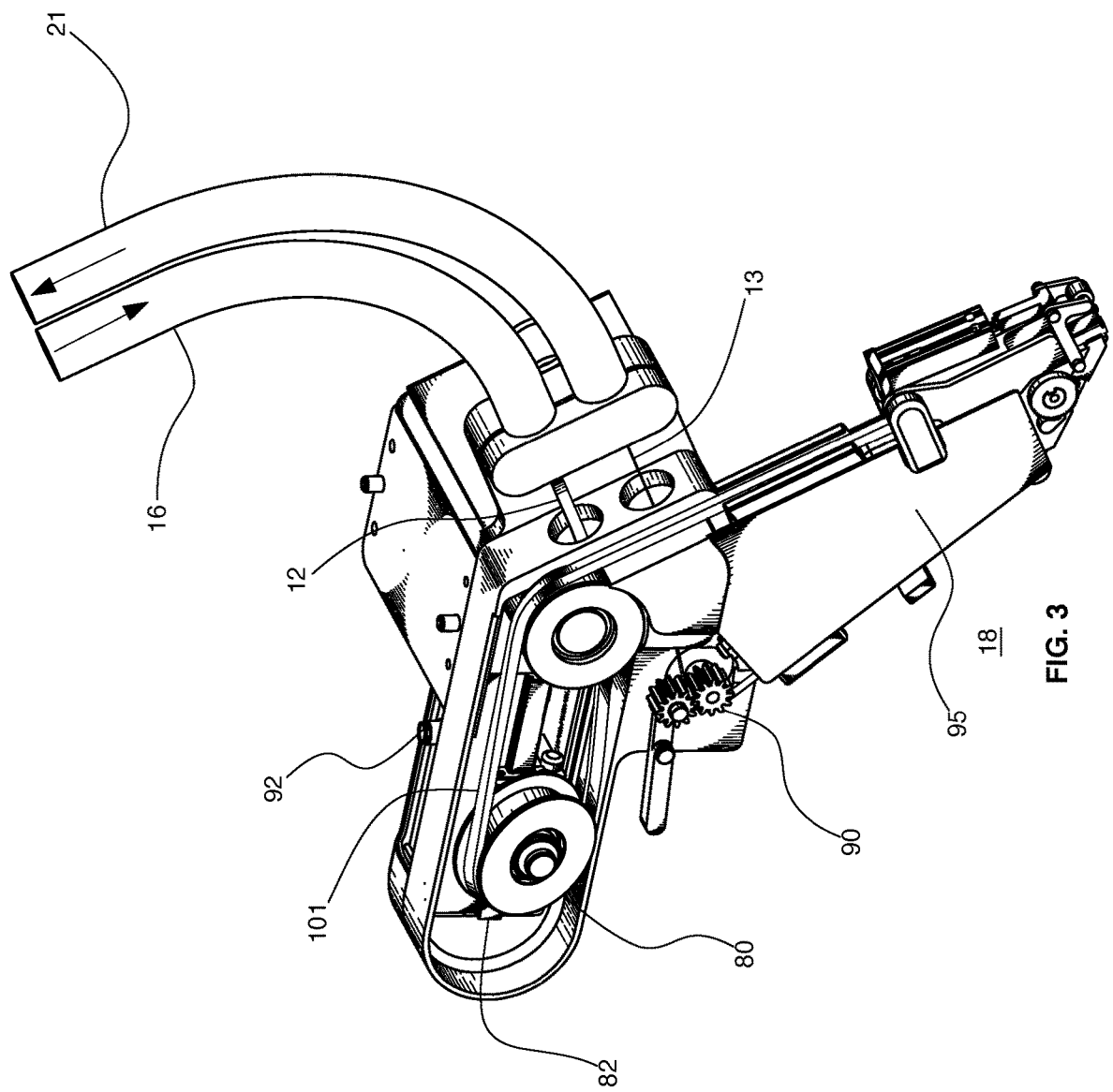
FIG. 3 shows a perspective view of an exemplary applicator head.

Looking at FIGS. 3 and 4, tape 11 exits flexible tube 16 at robotic applicator head 18, and tape 11 is wound around material buffer 80 by buffer refill mechanism 82. Generally, material buffer 80 is a loop of tape 11, or a reserve, of variable size, which accounts for feeding variances between payout drive mechanism 70 and head drive mechanism 90 and promotes application of consistent tension to tape 11, or controls the tension forces associated with tape 11. In one implementation, buffer refill mechanism comprises resilient means and a slide mechanism, such that as material buffer 80 shrinks, sensor 92 detects the level of compressed buffer loop 101 and commands payout drive mechanism 70 to send more tape 11 causing material buffer 80 to grow again.

Material buffer 80 is associated with buffer sensor 92 which determines a numerical position of material buffer 80, ranging from a predefined low threshold to a predefined high threshold. When material buffer 80 reaches the low threshold payout drive mechanism 70 is called upon to feed additional tape 11 to refill material buffer 80. When the buffer reaches the high threshold payout drive mechanism 70 is shut off. The numerical data being measured by position sensor 92 can predict tape 11 jams and tape 11 breakages and shut down system 10, thereby minimizing any possible further damage or equipment faults.

Next, head drive mechanism 90 is actuated and feeds tape 11 from material buffer 80 towards the application tip 100. Similar to drive mechanism 70, head drive mechanism 90 may include servo motors or stepper motors to control the advancement of tape 11 to applicator tip 100. For example, head drive mechanism 90 comprises a set of rollers or gears coupled to an electric motor, and configured to pull tape 11 around application tip 100, as shown in FIGS. 3 and 4. Material 12 is peeled off liner 13, or vice versa, by virtue of the geometry of application tip 100, which comprises rounded member 102, exposing the adhesive layer. Material 12 is advanced to application tip 100 prior to the commencement of the application of material 12 to the substrate, and buffer 101 includes a loop of tape 11 which accounts for feeding variances between payout drive mechanism 70 and head drive mechanism 90 and to ensure consistent tension is applied to tape 11, and assist with peeling off liner 13, and feeding tape 11. Accordingly, following program instructions executable by system controller 40 robotic arm 19 moves to the start position on the substrate and applicator head 18 begins to apply material 12 along a predefined application path while sending a feed command to actuate head drive mechanism 90 to index more tape 11, as needed. The predefined paths may be linear, nonlinear, three-dimensional, and so forth. In some instances, specialized hardware associated with robotic arm 19 determines the speed of robotic arm 19 movements, and transmits that speed to system controller 40, and the speed of head drive mechanism 90 is automatically adjusted to match the speed of the movements of the robotic arm 19. In other instances, the speeds may be calculated and manually adjusted in the program. With the aid of encoders or other tracking means, system controller 40 can determine the amount of tape 11 passing under applicator tip 100, including the precise location where tape 11 is to be applied.

As material 12 is applied, wet-out roller 104 associated with applicator head 18 follows the path of applied material 12 and applies pressure to material 12 to enhance adherement; or activate the adhesive on pressure-sensitive adhesive tapes 11. In some implementations, an additional tool is used to apply adhesion promoter on the substrate, such as along the predefined application path, before material 12 is applied. A vision system may be used to detect the presence of adhesion promoter on the substrate, and automatically apply material 12 to the sensed locations on the substrate. When applicator head 18 reaches the end of its pre-programmed application path it sends a command to system controller 40. Next, a cut sequence commences, and entails commanding blade actuator 95 to actuate and cause straight blade 106 to sever tape 11. Straight blade 106 performs a precision kiss cut by severing material 12 without severing liner 13 underlying material 12. Accordingly, the speed and depth of straight blade 106 into material 12 is precisely calibrated and stored in the calibration parameters in memory means associated with system controller 40, and may be dependent on the thickness of material 12 and liner 13. Alternatively, the speed and depth of straight blade 106 into material 11 is precisely calibrated via mechanical means. For example, a positioning device comprising one of a threaded adjuster, an eccentric lobe, and a stop capable of modification to suit a predetermined thickness, for performing adjustments. Blade actuator 95 may be any one a fluidic muscle, electric actuator, pneumatic actuator, and a hydraulic actuator. Upon completion of the cut, robotic arm 19 makes a final move to apply the last millimeters of material 12 up to the cut location and rolls material 12 with wet-out roller 104. In other implementations, blade 106 may be serrated or non-serrated, angled, curved, or heated to enhance the cutting sequence.

As head drive mechanism 90 draws tape 11, head drive mechanism 90 simultaneously expels spent liner 13, and guides liner 13 into outfeed tube 21 for disposal. Similar to infeed tube 16, outfeed tube 21 includes outfeed fluid amplifier 73 to pull the spent liner 13 away from applicator head 18 towards payout device 14, where used liner 13 is collected in a disposal bin 110. Payout device 14 may include cutting device 66 to cut used liner 13 to manageable sizes to facilitate disposal.

Figure 5A:
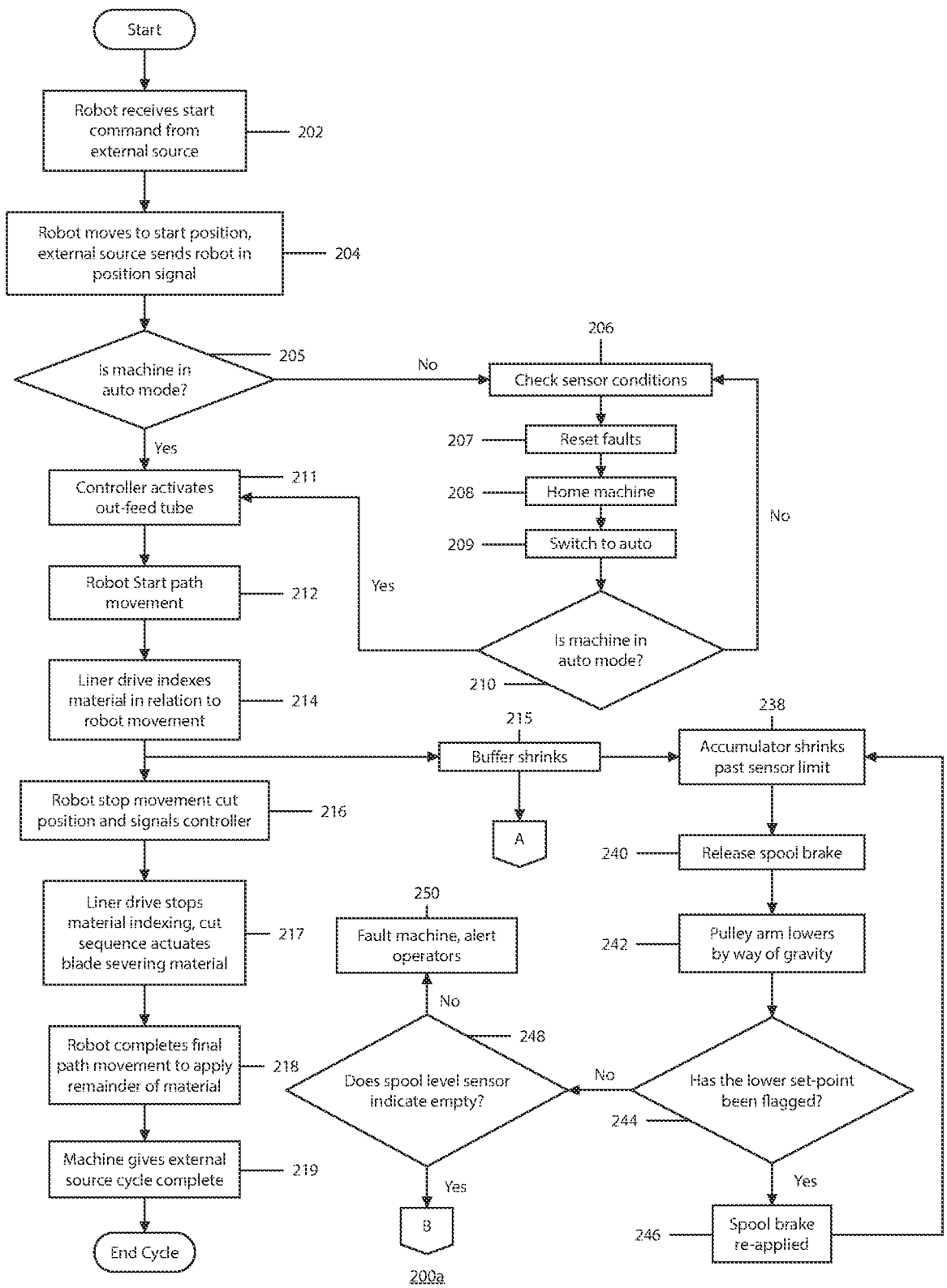
FIGS. 5a-c show a flowchart outlining exemplary steps for a method for applying an adhesive tape to a substrate or a surface.
Figure 5B:
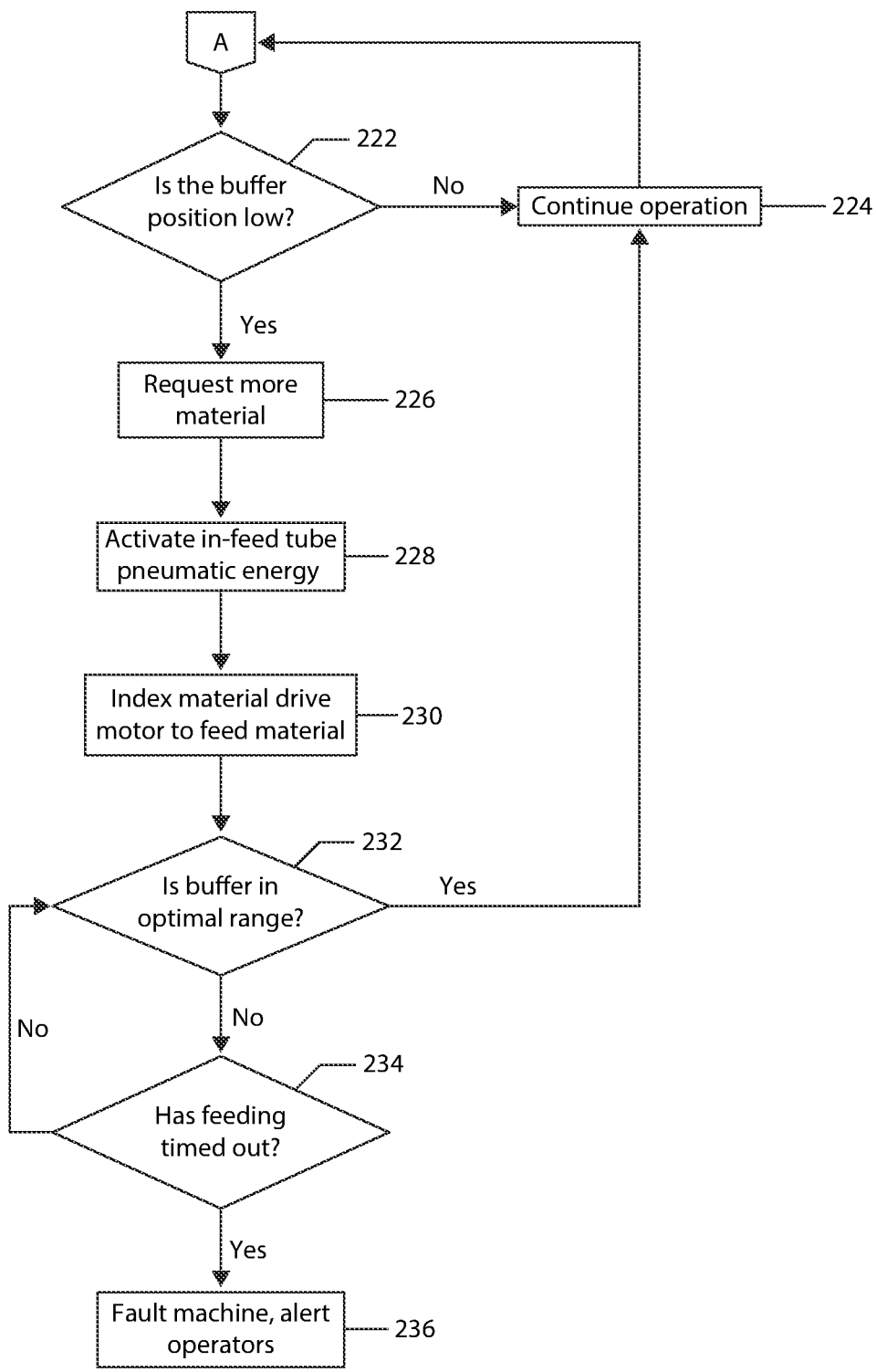
Figure 5C:
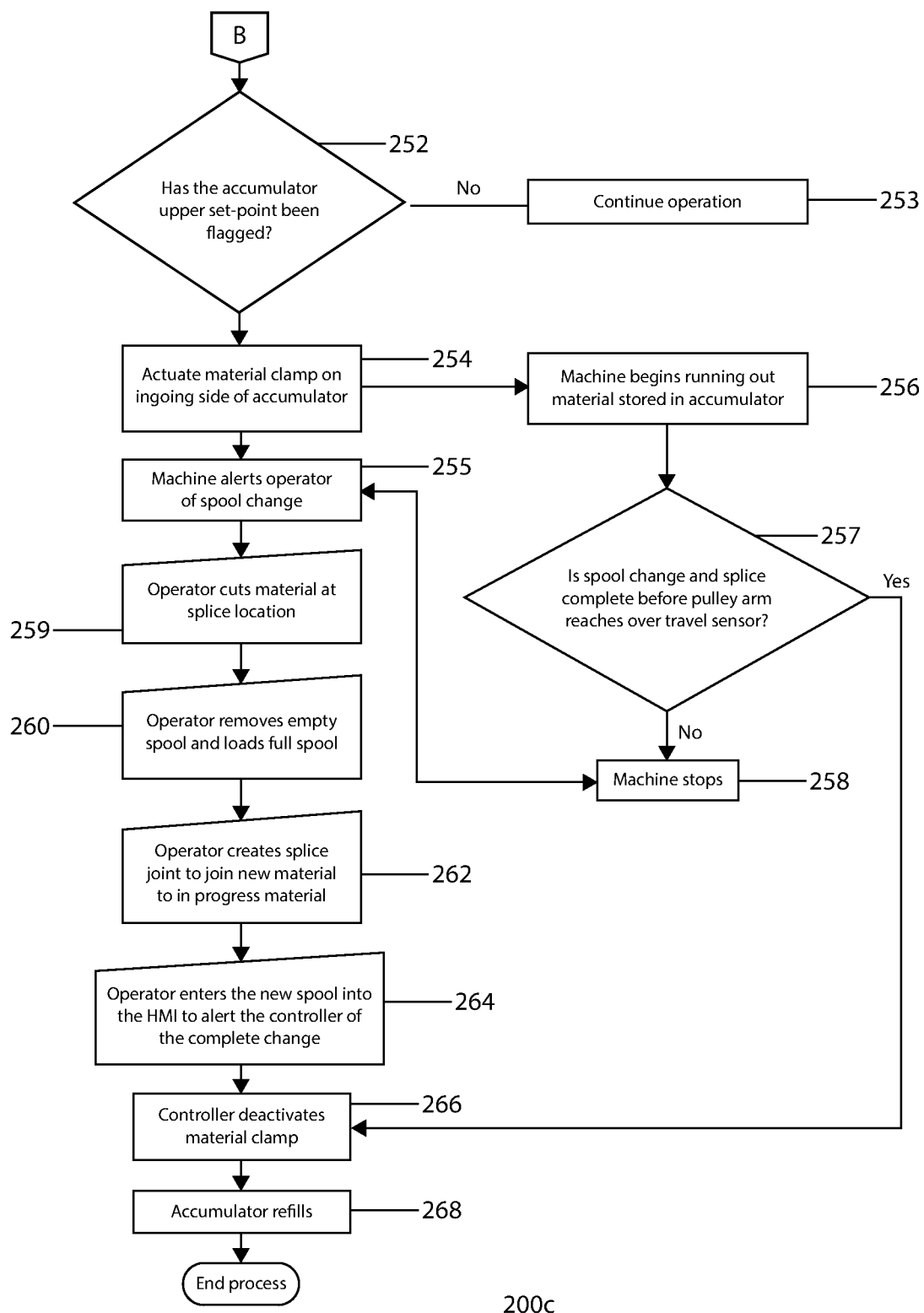

An operating cycle of system 10 will now be described with reference to a flow charts 200a-c as shown in FIGS. 5a-c. In step 202 of the cycle, robotic arm 19 in a cell receives a start command from an external source having programmed instructions to apply adhesive tape 11 along a predefined path on a substrate. In accordance with the instructions, robotic arm 19 moves to a start position and the external source sends a robot in position signal (204), and system controller 40 determines whether payout device 14 is in auto mode (205) When payout device 14 is in auto mode then system controller 40 activates fluid amplifier 73 (211), otherwise system controller 40 determines the conditions of accumulator 50 and payout spool 34 based on the status signals from the accumulator sensor 60, and spool level sensor 68, step 206. Next, via human machine interface 42, operator instructs system controller 40 to reset payout device 14 to home position (208) and switches payout device 14 to auto mode (209). In step 210, system controller 40 determines whether payout device 14 is in auto mode, and when payout device 14 is not in auto mode the process returns to step 206, otherwise system controller 40 activates payout drive mechanism 70, fluid amplifier 72 to feed material 11 along flexible infeed conduit 16 towards applicator head 18 (211), including head drive mechanism 90 to feed material 11 to the application tip 100 (212).

In step 214, robotic arm 19 commences applying tape 11 along the predefined path on the substrate, and head drive mechanism 90 indexes material 11 in relation to robotic arm 19 movement. As material 11 is applied to the substrate, the length of material 11 in buffer loop 101 of applicator head 18 diminishes (215), and system controller 40 continually determines the level of buffer 101 based on the output signals from buffer sensor 92 (222). At the end of the predefined path, robotic arm 19 stops and signals system controller 40 (216), and system controller 40 issues a command to head drive mechanism 90 to stop indexing material 11 and another command to applicator head 18 to actuate straight blade 106 to sever material 11 (217), and the process continues with robotic arm 19 applying material 11 at a new location of the predefined path, or another predefined path on the substrate. In step 218, robotic arm 19 completes the final path movement to apply the remainder of material 11, and payout device 14 issues a cycle complete signal to the external source (219), and the cycle ends.

As material 11 is applied to the substrate, in step 215, the length of material 11 in buffer 101 of applicator head 18 diminishes (220), and system controller 40 continually determines the level of buffer 101 based on the output signals from buffer sensor 92 (222). If the level of buffer 101 is within a predefined threshold then the process continues (224), otherwise a request for more material 11 is made (226) and system controller 40 activates fluid amplifier 72 to facilitate transport of material 11 via infeed conduit 16

(228). Payout drive mechanism 70 indexes material 11 to applicator head 18 to replenish buffer loop 101 (230), and system controller 40 determines whether the level of buffer 80 is within the predetermined levels based on the output signals from buffer sensor 92 (232). When the level of buffer 101 is within the predetermined levels then the process continues to step 224, otherwise a determination is made as to whether material 11 feeding has timed out (234), if there is a time out then a fault alarm or notification is issued by system controller 40 alerting an operator to rectify the situation (236), otherwise the process returns to step 232.

Back to step 215, as material 11 is applied to the substrate the length of material 11 in buffer 80 and accumulator 50 also diminishes (238), spool brake 44 is released (240) and lower pulley arm 52 lowers by way of gravity (242), and system controller 40 determines whether the lower threshold has been flagged based on the output from accumulator sensor 60 when lower limit set point is triggered (244). When the lower threshold has been flagged then spool brake 44 is re-applied (246) and the process returns to step 238; otherwise the process proceeds to step 248 where system controller 40 determines the level of payout spool 34 based on the output from payout spool sensor 68. If payout spool sensor 68 indicates that payout spool 34 is empty then a fault alarm or notification is issued by system controller 40 to alert an operator to rectify the situation (250), otherwise system controller 40 determines whether accumulator 50 upper threshold has been flagged (252) based on output signals from accumulator sensor 60.

Accordingly, in one implementation, depleted spool 34 may be swapped for a new spool 34 of material 11 without interrupting the application cycle in progress. Accordingly, the spool 34 changeover minimizes production downtime. If upper threshold has not been flagged then operation continues (253), otherwise material clamp 36 on incoming side of accumulator 50 is actuated (254) to clamp the new material 11 entering accumulator 50. In step 255 system controller 40 issues an alert notifying an operator to change spool 34.

While the new material 11 is clamped, payout device 14 continues to index material 11 to applicator head 18 by using up reserve material 11 (e.g. up to 20 meters) stored in accumulator 50, while operator swaps spools 34 within a predefined swap time i.e. the amount of time to complete a spool 34 change (256). As an example, the predefined swap time may be determined by dividing the length (meters) of the reserve material 11 in accumulator 50 by application rate of material 11 (meters per minute). For example, for a material 11 reserve of 20 meters, and an application rate of 1 meter per minute, then the predefined swap time is 20 minutes. Generally, the predefined swap time depends on the cycle time of system 10, user preferences and settings. In step 257, when system controller 40 determines that the spool change and the splice process is completed before lower pulley arm 52 passes upper limit of sensor 60, then the process proceeds to step 266, otherwise operation of payout device 14 is halted by system controller 40 (258) and operator is alerted by system controller 40 to change spool 34 (256).

Operator cuts material 11 at splice location (259) and operator removes empty spool 34 and loads a new full spool 34 (260). Next, operator creates splice joint to join an end of new material 11 to an end of in-progress material 11 clamped before accumulator 50 (262). Splicing fixture 65 is provided to make these splices expeditiously, and in a consistent manner Once operator completes the change of spool 34 and the splice joint, a command is input via human machine interface 42 to indicate completion of the task (264). System controller 40 receives the completion signal and deactivates material clamp 36 (266) and accumulator 50, which was depleted during the splice sequence as per normal operation, refills (268). When the splice joint reaches applicator head 18, splice sensor 93 positioned to detect this joint triggers applicator head 18 to enter a purge cycle. Generally, the purge cycle consists of applying material 11 with the splice to disposal surface, that is, not on the predefined application path. Once enough material 11 has been purged to ensure the splice is eliminated, system 10 resumes normal operation, and the process ends. Alternatively, the operator may load a new spool 260 and thread the new material 11 in the payout device 14 and advance the material 11 to the applicator head 18, that is, without any splice joints.

In one implementation, adhesive tape 11 can be single- or double-sided tape, in a monolithic or layered format.

In one implementation, material clamp 36 on the incoming side of accumulator 50 is manually actuated to clamp the new material 11 entering accumulator 50.

In one implementation, material clamp 36 on the incoming side of accumulator 50 is electrically actuated to clamp the new material 11 entering accumulator 50.

In one implementation, material clamp 36 on the incoming side of accumulator 50 is pneumatically actuated to clamp the new material 11 entering accumulator 50.

In one implementation, adhesive tape 11 travels through a delamination device comprising rollers configured to separate material 12 and removable liner 13 from each other temporarily before reapplying material 12 to removable liner 13 to loosen the bond.

In one implementation, applicator head 18 comprises a vision system, which includes an image capture device to verify the correct application of material 11 on the substrate part or work piece, and identify substrate features or edges to facilitate self-alignment of application tip 100 with the predefined application path.

In one implementation, applicator head 18 comprises a vision system, which includes a laser profiler to verify the correct application of material 11 on the substrate part or work piece, and identify substrate features or edges to facilitate self-alignment of application tip 100 with the predefined application path.

In one implementation, application tip 100 comprises means for tracking and calculating the amount of material 11 between blade 106 and the application tip 100.

In one implementation, applicator head 18 comprises a sensor located on the outbound side of applicator tip 100 to sense the presence of material 11 indicating a failed application In one implementation, applicator head 18 comprises an attachment containing an adhesion promoter and a device for applying said adhesion promoter to the substrate.

In one implementation, applicator head 18 comprises an air blower located at the application tip to help peel the material 11 off liner 13.

In one implementation, liner 13 is collected and severed into smaller manageable pieces.

In one implementation, applicator head 18 comprises at least one safety device for mounting on industrial robot 20.

In one implementation, industrial robot 20 is a servo gantry style robot.

In one implementation, industrial robot 20 is a collaborative robot.

In one implementation, applicator head 18 is fixed in position and the part to receive material 11 is moved to applicator head 18, that is, a part-to-process strategy. In one example, the part may be on a robot or any other means of actuation.

In one implementation, system 10 comprises a 'quick change' blade system.

In one implementation, system 10 comprises one or more safety devices mountable on a collaborative robot to enhance safe operation.

In one implementation, drive mechanism 70, 90 comprises a linear grip and pull mechanism, such as a walking beam transfer.

System 10 may be useful in the automotive sector, where material 11 is applied to automotive interior and exterior trim and claddings to reduce noise, seal moisture and to couple components together; and in the construction industry, such as trim and seals for glazing materials e.g. interior and exterior building architectural claddings and HVAC equipment.

In one implementation, system 10 is coupled to a measurement or data acquisition (DAQ) devices, such as, instruments, smart sensors, data acquisition devices or boards, and any of various types of devices that are operable to acquire and/or store data.

Figure 6:
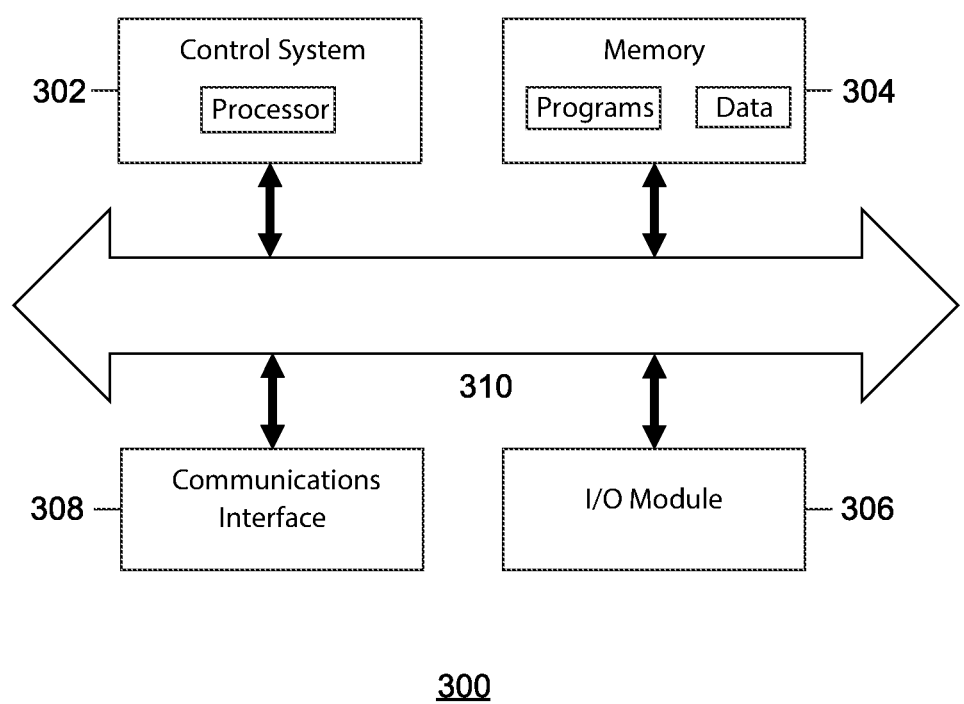
FIG. 6 shows an exemplary computing system.

In one implementation, system controller 40 comprises computing means with computing system 300 comprising at least one processor such as processor 302, at least one memory device such as memory 304, input/output (I/O) module 306 and communication interface 308, as shown in FIG. 6. Although computing system 300 is depicted to include only one processor 302, computing system 300 may include a number of processors therein. In an embodiment, memory 304 is capable of storing instructions. Further, the processor 302 is capable of executing instructions.

In one implementation, processor 302 may be configured to execute hard-coded functionality. In an embodiment, processor 302 may be embodied as an executor of software instructions, wherein the software instructions may specifically configure processor 302 to perform algorithms and/or operations described herein when the software instructions are executed.

In one implementation, processor 302 may be embodied as a multi-core processor, a single core processor, or a combination of one or more multi-core processors and one or more single core processors. For example, processor 302 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, Application-Specific Standard Products (ASSPs), System-on-a-chip systems (SOCs), Complex Programmable Logic Devices (CPLDs), Programmable Logic Controllers (PLC), Graphics Processing Units (GPUs), and the like. For example, some or all of the device functionality or method sequences may be performed by one or more hardware logic components.

Memory 304 may be embodied as one or more volatile memory devices, one or more non-volatile memory devices, and/or a combination of one or more volatile memory devices and non-volatile memory devices. For example, memory 304 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY™ Disc), and semiconductor memories (such as mask ROM, PROM (programmable ROM), EPROM (erasable PROM), flash ROM, RAM (random access memory), etc.).

I/O module 306 is configured to facilitate provisioning of an output to a user of computing system 300 and/or for receiving an input from the user of computing system 300, and send/receive communications to/from the various sensors, components, and actuators of system 10. I/O module 306 is configured to be in communication with processor 302 and memory 304. Examples of the I/O module 306 include, but are not limited to, an input interface and/or an output interface. Some examples of the input interface may include, but are not limited to, a keyboard, a mouse, a joystick, a keypad, a touch screen, soft keys, a microphone, and the like. Some examples of the output interface may include, but are not limited to, a microphone, a speaker, a ringer, a vibrator, a light emitting diode display, a thin-film transistor (TFT) display, a liquid crystal display, an active-matrix organic light-emitting diode (AMOLED) display, and the like. In an example embodiment, processor 302 may include I/O circuitry configured to control at least some functions of one or more elements of I/O module 306, such as, for example, a speaker, a microphone, a display, and/or the like. Processor 302 and/or the I/O circuitry may be configured to control one or more functions of the one or more elements of I/O module 306 through computer program instructions, for example, software and/or firmware, stored on a memory, for example, the memory 304, and/or the like, accessible to the processor 302.

Communication interface 308 enables computing system 300 to communicate with other entities over various types of wired, wireless or combinations of wired and wireless networks, such as for example, the Internet. In at least one example embodiment, the communication interface 308 includes a transceiver circuitry configured to enable transmission and reception of data signals over the various types of communication networks. In some embodiments, communication interface 308 may include appropriate data compression and encoding mechanisms for securely transmitting and receiving data over the communication networks. Communication interface 308 facilitates communication between computing system 300 and I/O peripherals.

In an embodiment, various components of computing system 300, such as processor 302, memory 304, I/O module 306 and communication interface 308 may be configured to communicate with each other via or through a centralized circuit system 310. Centralized circuit system 310 may be various devices configured to, among other things, provide or enable communication between the components (302-308) of computing system 300. In certain embodiments, centralized circuit system 310 may be a central printed circuit board (PCB) such as a motherboard, a main board, a system board, or a logic board. Centralized circuit system 310 may also, or alternatively, include other printed circuit assemblies (PCAs) or communication channel media.

It is noted that various example embodiments as described herein may be implemented in a wide variety of devices, network configurations and applications.

Those of skill in the art will appreciate that other embodiments of the disclosure may be practiced in network computing environments with many types of computer system configurations, including personal computers (PCs), industrial PCs, desktop PCs), hand-held devices, multi-processor systems, microprocessor-based or programmable consumer electronics, network PCs, server computers, minicomputers, mainframe computers, and the like. Accordingly, system 10 may be coupled to these external devices via the communication, such that system 10 is controllable remotely. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In another implementation, system 10 follows a cloud computing model, by providing an on-demand network access to a shared pool of configurable computing resources (e.g., servers, storage, applications, and/or services) that can be rapidly provisioned and released with minimal or nor resource management effort, including interaction with a service provider, by a user (operator of a thin client).

The benefits and advantages described above may relate to one embodiment or may relate to several embodiments. The embodiments are not limited to those that solve any or all of the stated problems or those that have any or all of the stated benefits and advantages. The operations of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A system comprising:
   a source of a tape comprising a material associated with an adhesive and at least one removable liner;
   an applicator head;
   a cutting mechanism;
   at least one drive feeding mechanism configured to index the tape from the source to the applicator head at a controlled rate;
   wherein the applicator head is controllable to apply the material on a surface;
   wherein the applicator head comprises the cutting mechanism configured to sever the material while leaving the at least one removable liner intact;
   wherein the tape is conveyed to the applicator head via a flexible conduit and
   wherein the at least one drive feeding mechanism comprises a fluid amplifier which creates a vacuum effect in the flexible conduit.

2. The system of claim 1, wherein the applicator head comprises an applicator tip, and wherein the applicator tape head is mounted on a robot configured to travel along a predefined application path to apply the material.

3. The system of claim 1, wherein the at least one drive feeding mechanism comprises a drive unit for indexing the tape towards the applicator head.

4. The system of claim 1, wherein the source comprises a payout spool of the tape mounted on a rotatable shaft.

5. The system of claim 2, wherein the robot positions the applicator head to apply the tape using at least one first sensor.

6. The system of claim 5, wherein the at least one first sensor identifies features or edges to facilitate self-alignment of the application tip with the predefined application path.

7. The system of claim 5, wherein the at least one first sensor verifies correct application of the adhesive-backed material on the surface.

8. The system of claim 5, wherein the at least one first sensor comprises an image capture device.

9. The system of claim 5, wherein the at least one first sensor comprises a laser profiler.

10. The system of claim 1, wherein the tape is of variable dimensions.

11. The system of claim 5, wherein the at least one drive feeding mechanism comprises at least one second sensor and the applicator head comprises at least one third sensor, whereby the at least one second sensor and the at least one third sensor detect whether tension in the tape is maintained.

12. The system of claim 11, wherein the at least one drive feeding mechanism comprises a buffer having a variable loop of the tape, and at least one fourth sensor configured to detect a position of the tape within the buffer and thereby trigger the drive unit to feed the tape to the applicator head.

13. The system of claim 1, further comprising a human machine interface (HMI).

14. The system of claim 13, wherein human machine interface (HMI) is communicatively coupled to a controller associated with the source, the applicator head, the cutting mechanism, and the at least one drive feeding mechanism.

15. The system of claim 1, wherein the application tip comprises a rounded edge configured to peel the at least one removable liner from the material to expose the adhesive for adhering to the surface.

16. The system of claim 1, wherein an outgoing feed tube conveys the spent at least one removable liner away from the applicator head.

17. The system of claim 12, further comprising at least one fifth sensor configured to detect a splice joint in the tape and trigger the system to initiate a purge routine.

18. The system of claim 17, wherein the purge routine comprises disposing the material away from the surface.

19. The system of claim 2, further comprising a roller mechanism to exert a force to the material on the surface.

20. The system of claim 2, wherein the applicator head comprises an apparatus for applying an adhesion promoter to the surface prior to application of the material.

21. The system of claim 17, wherein at least one sixth sensor detects the presence of adhesion promoter and automatically applies the material to a location having the adhesion promoter thereon.

22. The system of claim 1, wherein the conduit is a tube.

23. The system of claim 1, wherein the applicator head is mounted on at least one movable axis to automatically apply the material according to programmed instructions.

24. The system of claim 1, wherein the applicator head is mounted on a robot to automatically apply the material according to programmed instructions.

25. The system of claim 2, further comprising a controller comprising a computer readable medium with program instructions executable by a processor to at least cause:
   the at least one drive feeding mechanism to index the tape;
   the application tip to apply the material to the surface in accordance to a predefined path;

the cutting mechanism associated with the applicator head to sever the material while leaving at least one removable liner intact;

a roller mechanism associated with the applicator head to exert a force to the material on the surface; and a disposal means to collect the at least one removable liner post application of the material.

26. The system of claim 2, wherein the applicator comprises at least one safety device for mounting on a collaborative robot.

27. The system of claim 16, wherein the at least one removable liner is collected and severed into smaller manageable pieces.

28. A system for applying a tape to a surface, the tape comprising a material associated with an adhesive and at least one removable liner, the system comprising:
 a source of the tape;
 a robotic applicator head comprising an application tip;
 a flexible conduit coupled between the source and the robotic applicator head;
 at least one drive feeding mechanism; and
 wherein the tape is conveyed to the applicator head via the flexible conduit;
 wherein the at least one drive feeding mechanism comprises a fluid amplifier which creates a vacuum effect in the flexible conduit;
 a cutting mechanism;
 a controller comprising program instructions executable by a processor to at least cause:
 the at least one drive feeding mechanism to index the tape from the source to the application tip;
 the application tip to apply the material to the surface in accordance to a predefined path; and
 the cutting mechanism to sever the material while leaving at least one removable liner intact.

29. The system of claim 28, further comprising a roller mechanism to exert a force to the tape on the surface.

30. The system of claim 29, further comprising a disposal means for the at least one removable liner post application of the material.

31. The system of claim 30, wherein the disposal means comprises at least one of a receptacle and a conduit.

32. The system of claim 28, wherein the controller comprises a computer readable medium with program instructions executable by a processor to at least cause:
 the at least one drive feeding mechanism to index the tape;
 the application tip to apply the material to the surface in accordance to the predefined path;
 the cutting mechanism to sever the material while leaving the at least one removable liner intact;
 a roller mechanism associated with the applicator head to exert a force to the tape on the surface; and
 a disposal means to collect the at least one removable liner post application of the material.

33. A method of applying a tape to a surface, the tape comprising a material and at least one removable liner, the method comprising the steps of:
 (a) at a first tape station, receiving the tape from a primary tape supply source;
 (b) feeding the tape into a flexible infeed conduit coupled between the first tape station and a remote robotic end-effector having a tape applicator, the flexible infeed conduit being dimensioned to permit transport of the tape to the remote robotic end-effector, wherein the tape is conveyed to the remote robotic end-effector via the flexible infeed conduit; wherein at least one drive feeding mechanism comprises a fluid amplifier which creates a vacuum effect in the flexible infeed conduit;
 (c) at a second tape station associated with the tape applicator, receiving the tape from the primary tape supply source to form a secondary source of tape;
 (d) at the tape applicator, applying the material on the surface along a predefined path and removing the at least one removable liner from the primary tape supply source; and
 (e) at an end of the predefined path, severing the material while leaving the at least one removable liner intact.

34. The method of claim 33, wherein the first tape station comprises a series of opposed pulleys to form a plurality of loops of the tape to create a buffer of the tape before feeding the tape to the second tape station.

35. The method of claim 33, comprising a further step of maintaining a predetermined tension force within the tape during a demand cycle.

36. The method of claim 33, comprising a further step of guiding the at least one removable liner into a flexible outfeed conduit.

37. The method of claim 33, comprising a further step of exerting pressure on the material to force the material on the surface.

* * * * *